(12) United States Patent
Shelton

(10) Patent No.: US 9,619,165 B1
(45) Date of Patent: Apr. 11, 2017

(54) CONVERTIBLE LEAF MEMORY MAPPING

(71) Applicant: SanDisk Technologies Inc., Plano, TX (US)

(72) Inventor: Lance Shelton, Philadelphia, PA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/929,171

(22) Filed: Oct. 30, 2015

(51) Int. Cl.
G06F 12/14 (2006.01)
G06F 3/06 (2006.01)

(52) U.S. Cl.
CPC .......... *G06F 3/0629* (2013.01); *G06F 3/0604* (2013.01); *G06F 3/0638* (2013.01); *G06F 3/0679* (2013.01)

(58) Field of Classification Search
CPC ... G06F 3/0629; G06F 3/0679; G06F 12/0246
USPC ......................................................... 711/103
See application file for complete search history.

(56) References Cited

U.S. PATENT DOCUMENTS

| | | | |
|---|---|---|---|
| 9,170,938 | B1 | 10/2015 | Walsh et al. |
| 2003/0229627 | A1 | 12/2003 | Carlson et al. |
| 2004/0167898 | A1 | 8/2004 | Margolus et al. |
| 2007/0156842 | A1 | 7/2007 | Vermeulen et al. |
| 2007/0174309 | A1 | 7/2007 | Pettovello |
| 2007/0185902 | A1 | 8/2007 | Messinger et al. |
| 2009/0012976 | A1 | 1/2009 | Kang et al. |
| 2009/0119450 | A1* | 5/2009 | Saeki ................. G06F 12/0246 711/103 |
| 2011/0145512 | A1 | 6/2011 | Adl-Tabatabai et al. |
| 2011/0252067 | A1 | 10/2011 | Marathe et al. |
| 2012/0005419 | A1 | 1/2012 | Wu et al. |
| 2012/0259863 | A1 | 10/2012 | Bodwin et al. |
| 2015/0242307 | A1 | 8/2015 | Busaba et al. |

(Continued)

FOREIGN PATENT DOCUMENTS

| WO | WO 2015/047398 | 4/2015 |
|---|---|---|
| WO | WO 2015/152830 | 10/2015 |

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).

(Continued)

*Primary Examiner* — Jae Yu
(74) *Attorney, Agent, or Firm* — Morgan, Lewis & Bockius LLP

(57) ABSTRACT

Systems, methods and/or devices are used to store metadata in a storage system. In one aspect, an indication of data to be stored by the storage system is received by a computing device including non-volatile memory and a tiered data structure. A leaf having a first leaf type is selected from the tiered data structure. Leaves of the first leaf type include locations of variable-length data stored in the non-volatile memory. At least one criterion is used to determine whether to convert the selected leaf to a converted leaf having a second leaf type. Leaves of the second type include locations of fixed-length data. In response to a determination to convert the selected leaf to a converted leaf, first location information is stored in the converted leaf. In response to a determination to not convert the selected leaf, second location information is stored in the second leaf.

21 Claims, 9 Drawing Sheets

(56) References Cited

U.S. PATENT DOCUMENTS

2015/0277794 A1 10/2015 Tudor et al.
2015/0278093 A1 10/2015 O'Krafka et al.
2015/0281389 A1 10/2015 Firsov et al.

OTHER PUBLICATIONS

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Sep. 14, 2016, received in International Patent Application No. PCT/US2016/036720, which corresponds to U.S. Appl. No. 15/144,704, 12 pages (Cheru).

* cited by examiner

500

---

One or more of the receiving, selecting, determining, storing in the converted leaf, or storing in the selected leaf are performed by a storage device of the storage system, wherein the storage device stores the data to be stored. ⎯530

---

One or more of the receiving, selecting, determining, storing in the converted leaf, or storing in the selected leaf are performed by one or more subsystems of the storage system distinct from a storage device, wherein the storage device stores the data to be stored. ⎯532

Figure 5C

CONVERTIBLE LEAF MEMORY MAPPING

TECHNICAL FIELD

The disclosed embodiments relate generally to memory systems, and in particular, to reducing the amount of memory consumed by tiered data structures.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

As flash memory storage systems grow in size, the efficiency with which data stored by flash memory can be accessed becomes more important. Tiered data structures can be used to improve the speed and efficiency of data access. Some tiered data structures enable data searches, data insertions, data deletions, and sequential data access to be performed in logarithmic time. Often, a tiered data structure is used for mapping physical locations of stored data in flash memory to logical addresses. However, when the average size of data writes is small, memory consumed by a tiered data structure may increase dramatically. Improvements to tiered data structure components can reduce the amount of memory consumed by the tiered data structure.

SUMMARY

Without limiting the scope of the appended claims, after considering this disclosure, and particularly after considering the section entitled "Detailed Description" one will understand how the aspects of various embodiments are used to create a tiered data structure including multiple leaf types, where entries of a first leaf type include indications of locations of variable-length data and where entries of a second leaf type include indications of locations of fixed-length data.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 5A-5C illustrate a flowchart representation of a method of storing metadata, in accordance with some embodiments.

Figure 1:
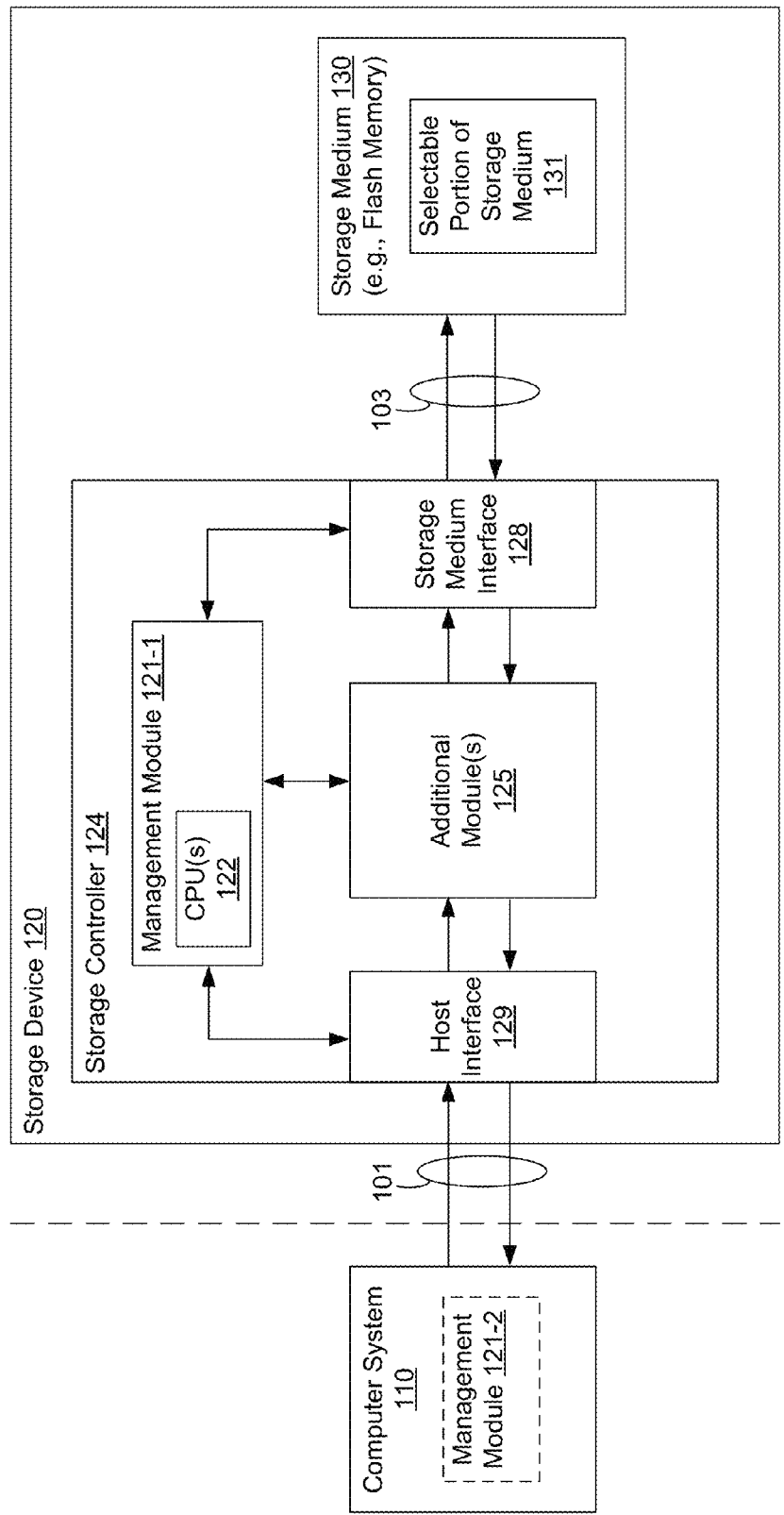
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

A tiered data structure used for storing location metadata for flash memory storage has leaf nodes, sometimes herein called leaves, with entries including fields for storing information such as a key (i.e., a logical block address), a physical address (sometimes called a physical block address), a data length, etc. Factors such as the size of metadata entries in leaf nodes, data sparseness (i.e., prevalence of unmapped addresses intermixed with mapped addresses), extent to which data is written sequentially, etc., may result in a dramatic increase of space consumed by leaf nodes. In some situations, the amount of memory consumed by the tiered data structure may be reduced by changing the format for entries used in particular leaf nodes. It is noted that in this document the terms "leaf" and "leaf node" are used interchangeably, and thus mean the same thing.

The various embodiments described herein include systems, methods and/or devices used to determine whether to store metadata using a first leaf entry structure or a second leaf entry structure.

(A1) More specifically, some embodiments include a method of storing metadata. In some embodiments, the method includes, receiving, at a computing device of a storage system including non-volatile memory and a tree data structure including a plurality of leaves, an indication of data to be stored by a storage system. The method further includes selecting, from the plurality of leaves (sometimes called leaf nodes), a leaf (sometimes called a leaf node) to store location information for the data to be stored, wherein the selected leaf has a first leaf type. Leaves of the first leaf type include entries indicating locations of variable-length data stored in the non-volatile memory. The method further includes determining, using at least one first-type to second-type criterion, whether to convert the selected leaf to a converted leaf. The converted leaf has a second leaf type. Leaves of the second type include entries indicating locations of fixed-length data stored in the non-volatile memory. The method further includes, in response to a determination to convert the selected leaf to a converted leaf, storing, in the converted leaf, first location information of the data to be stored. The method further includes, in response to a determination to not convert the selected leaf, storing, in the selected leaf, second location information of the data to be stored.

(A2) In some embodiments of the method of A1, the first location information includes a physical block address of the data to be stored.

(A3) In some embodiments of the method of any of A1-A2, the second location information includes a physical block address of the data to be stored and at least one of: a logical block address of the data to be stored, or an indication of length of the data to be stored.

(A4) In some embodiments of the method of any of A1-A3, the tree data structure includes at least one leaf of the first leaf type and at least one leaf of the second leaf type, wherein the at least one leaf of the second leaf type stores a base logical address and a sequence of fixed-size entries, where each fixed-size entry for a mapped location includes a physical address (sometimes called a physical block address).

(A5) In some embodiments of the method of any of A1-A4, the at least one first-type to second-type criterion includes a criterion that is satisfied in accordance with an indication that an insertion (i.e., of one or more entries) into the selected leaf will cause the selected leaf to split.

(A6) In some embodiments of the method of any of A1-A5, the at least one first-type to second-type criterion includes a criterion that is satisfied in accordance with a determination of a total size of potential new entries for the selected leaf and existing entries (if any) in the selected leaf, and a determination that the determined total size is less than or equal to a maximum size for all entries of a leaf of the second leaf type. The potential new entries indicate locations of the data to be stored.

(A7) In some embodiments of the method of any of A1-A6, the method further comprises determining, using at least one second-type to first-type criterion, whether to revert a leaf of the second type into a new leaf of the first leaf type.

(A8) In some embodiments of the method of A7, the leaf of the second leaf type has entries for a first number of locations, and the at least one second-type to first-type criterion includes a criterion that is satisfied in accordance with a determination that the new leaf of the first type has sufficient space to contain entries for all mapped locations indicated by the entries of the leaf of the second leaf type plus a predefined margin.

(A9) In some embodiments of the method of any of A7-A8, determining whether to revert the leaf of the second type into the new leaf of the first type occurs in response to an indication of data to be deleted by the storage system. The leaf of the second type contains location information for the data to be deleted.

(A10) In some embodiments of the method of any of A1-A9, determining whether to revert the leaf of the second type into the new leaf of the first type occurs in response to an indication of data to be overwritten by the storage system. The leaf of the second type contains location information for the data to be overwritten.

(A11) In some embodiments of the method of any of A1-A10, one or more of the receiving, selecting, determining, storing in the converted leaf, or storing in the selected leaf are performed by a storage device of the storage system, wherein the storage device stores the data to be stored.

(A12) In some embodiments of the method of any of A1-A10, one or more of the receiving, selecting, determining, storing in the converted leaf, or storing in the selected leaf are performed by one or more subsystems of the storage system distinct from a storage device, wherein the storage device stores the data to be stored.

(A13) In another aspect, a storage device includes (1) non-volatile memory, (2) one or more processors, and (3) controller memory (e.g., a non-transitory computer readable storage medium in the storage device) storing one or more programs, which when executed by the one or more processors cause the storage device to perform or control performance of any of the methods A1-A10 described herein.

(A14) In yet another aspect, any of the methods A1-A10 described above are performed by a storage device including means for performing any of the methods described herein.

(A15) In yet another aspect, some embodiments include a non-transitory computer readable storage medium, storing one or more programs configured for execution by one or more processors of a storage device, the one or more programs including instructions for performing any of the methods A1-A10 described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and a storage medium 130, and is used in conjunction with or includes a computer system 110. In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices, as further defined herein. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels, or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Storage medium 130 is coupled to storage controller 124 through connections 103. Connections 103 are sometimes called data connections, but typically convey instructions in addition to data, and optionally convey metadata, error correction information and/or other information in addition to data values to be stored in storage medium 130 and data values read from storage medium 130. In some embodiments, storage controller 124 and storage medium 130 are included in the same device (i.e., an integral device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded memory controller. Storage medium 130 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

In various embodiments, storage medium 130 includes and/or is included in one or more devices (e.g., computer system 110) remote from storage controller 124.

Storage medium 130 is divided into a number of addressable and individually selectable blocks, such as selectable portion 131. In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, storage controller 124 includes a management module 121-1, a host interface 129, a storage medium interface 128, and/or additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium interface 128 provides an interface to storage medium 130 though connections 103. In some embodiments, storage medium interface 128 includes read and write circuitry, including circuitry capable of providing reading signals to storage medium 130 (e.g., reading threshold voltages for NAND-type flash memory).

In some embodiments, management module 121-1 includes one or more processing units (e.g., CPU(s), also sometimes called processors) 122 configured to execute instructions in one or more programs (e.g., in management module 121-1). In some embodiments, the one or more CPU(s) 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory or reads from memory.

In some embodiments, module(s) as described herein, such as management module 121-1, management module 121-2, modules of management module 121-1, modules of management module 121-2, additional modules 125, etc. are executed in software by the one or more CPU(s) (e.g., CPU(s) 122 of management module 121-1, CPU(s) of computer system 110 (not shown) etc.). In other embodiments, module(s) as described herein are implemented in whole or in part using special purpose circuitry (e.g., to perform encoding and decoding functions).

In some embodiments, during a write operation, host interface 129 receives data to be stored in storage medium 130 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 130 in a manner dependent on the type of storage medium being utilized.

In some embodiments, a read operation is initiated when computer system (host) 110 sends one or more host read instructions (e.g., via data connections 101, or alternatively a separate control line or bus) to storage controller 124 requesting data from storage medium 130. Storage controller 124 sends one or more read access instructions to storage medium 130, via storage medium interface 128, to obtain raw read data in accordance with memory locations (addresses) specified by the one or more host read instructions. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells (SLC) or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

Figure 2A:
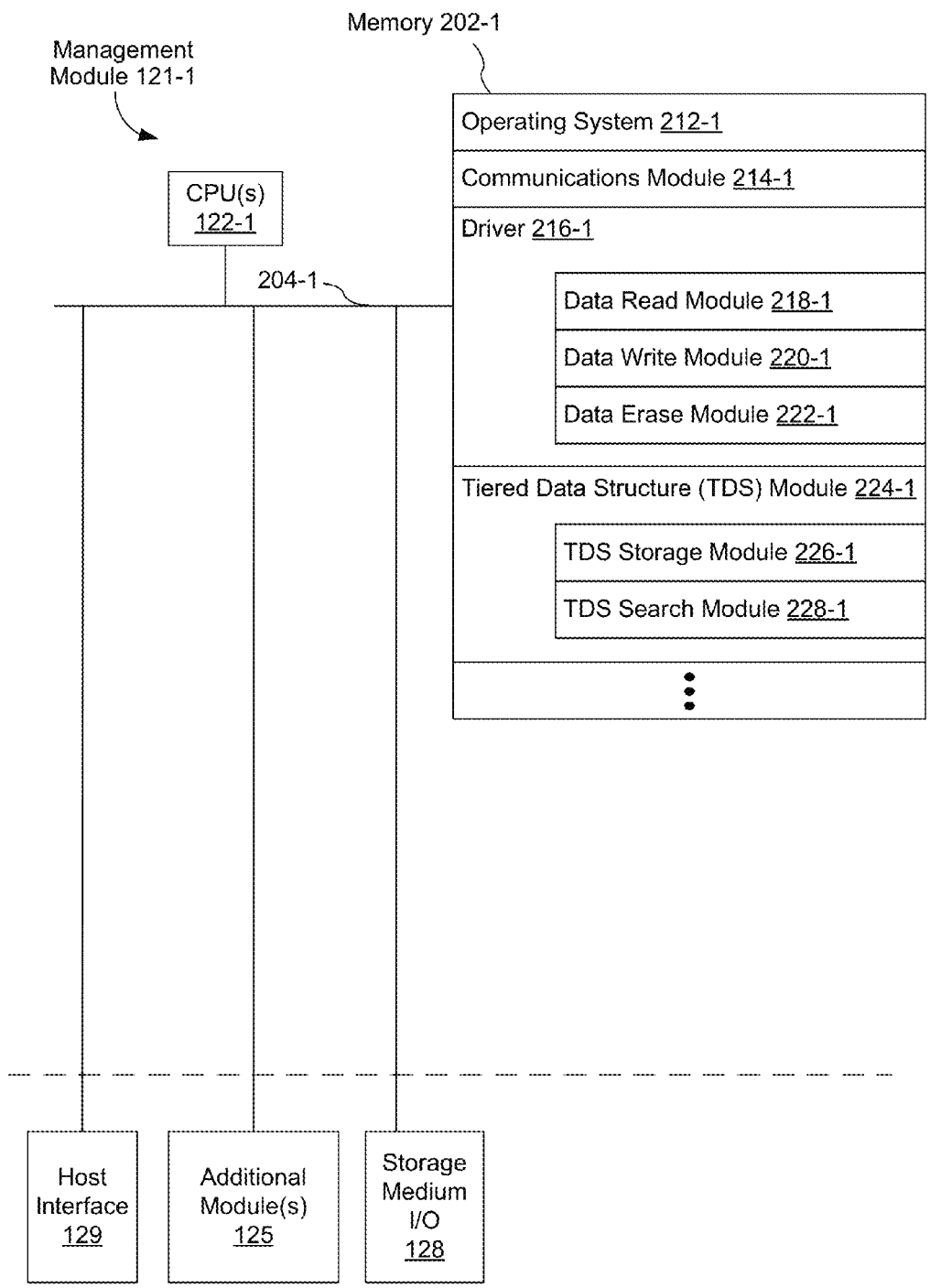
FIG. 2A is a block diagram illustrating an implementation of a management module, in accordance with some embodiments.

FIG. 2A is a block diagram illustrating a management module 121-1, as shown in FIG. 1, in accordance with some embodiments. Management module 121-1 typically includes one or more processing units 122-1 (sometimes called CPUs, processors, hardware processors, or microprocessors) for executing modules, programs and/or instructions stored in memory 202-1 and thereby performing processing operations, memory 202-1 (sometimes called controller memory), and one or more communication buses 204-1 for interconnecting these components. The one or more communication buses 204-1 optionally include circuitry (sometimes called a chipset) that interconnects and controls communications between system components. Management module 121-1 is coupled to host interface 129, additional module(s) 125, and storage medium interface 128 by the one or more communication buses 204-1. Memory 202-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 202-1 optionally includes one or more storage devices remotely located from the CPU(s) 122-1. Memory 202-1, or alternatively the non-volatile memory device(s) within memory 202-1, comprises a non-transitory computer readable storage medium. In some embodiments, memory 202-1, or the non-transitory computer readable storage medium of memory 202-1 stores the following programs, modules, and data structures, or a subset or superset thereof:

- Operating system 212-1, which includes procedures for handling various basic system services and for performing hardware dependent tasks.
- Communications module 214-1, which is used for communicating with other computer systems (e.g., computer system 110) (e.g., via host interface 129 and/or storage medium interface 128).
- Driver 216-1, which detects and processes requests received from internal requestors and/or external requestors such as additional module(s) 125, computer system 110, etc. (Requests are processed by, e.g., data read module 218-1, data write module 220-1, data erase module 222-1, etc.)
- Data read module 218-1, which reads data from one or more codewords, pages or blocks in a storage medium (e.g., storage medium 130).
- Data write module 220-1, which writes data to one or more codewords, pages or blocks in a storage medium (e.g., storage medium 130).
- Data erase module 222-1, which erases data from one or more blocks in a storage medium (e.g., storage medium 130).
- Tiered data structure (TDS) module 224-1, which stores and retrieves information (e.g., data objects and nodes) within one or more tiered data structures (also referred to herein as tree data structures). The one or more tiered data structures are typically stored in storage medium 130, but in some embodiments are stored at least in part (e.g., cached portions) in memory 202-1 or in memory of computer system 110. In some embodiments, the aforementioned data objects are stored in data nodes, sometimes called overflow nodes, of a tiered data structure, which in turn is stored in storage medium 130 (i.e., in non-volatile memory of the storage device). Physical addresses, sometimes called physical block addresses, indicate the locations in storage medium 130 at which the data objects are stored (e.g., locations in leaf nodes of the tiered data structure, which in turn is stored in storage medium 130). Tiered data structure module 224-1 includes TDS storage module 226-1 and TDS search module 228-1.
- TDS storage module 226-1, which performs memory operations (e.g., replacement, deletion, and insertion operations) by writing information, inserting a new data object, or replacing or updating the value of a data object) to leaf nodes of the one or more tiered data structures or deleting information (e.g., deleting a data object and/or replacing the value of a data object with a tombstone) from leaf nodes of the one or more tiered data structures so as to create new or modified leaf nodes and writing the new or modified leaf nodes to storage medium 130.
- TDS search module 228-1, which searches through the one or more tiered data structures for requested data (e.g., locating and retrieving a data object or node corresponding to a memory operation in a transaction requested by a requestor).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 202-1 may store a subset of the modules and data structures identified above. Furthermore, memory 206-1 may store additional modules and data structures not described above. In some embodiments, the programs, modules, and data structures stored in memory 206-1, or the non-transitory computer readable storage medium of memory 206-1, provide instructions for implementing some of the methods described below. In some embodiments, some or all of these modules may be implemented with specialized hardware circuits that subsume part or all of the module functionality.

Although FIG. 2A shows management module 121-1 in accordance with some embodiments, FIG. 2A is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 2B:
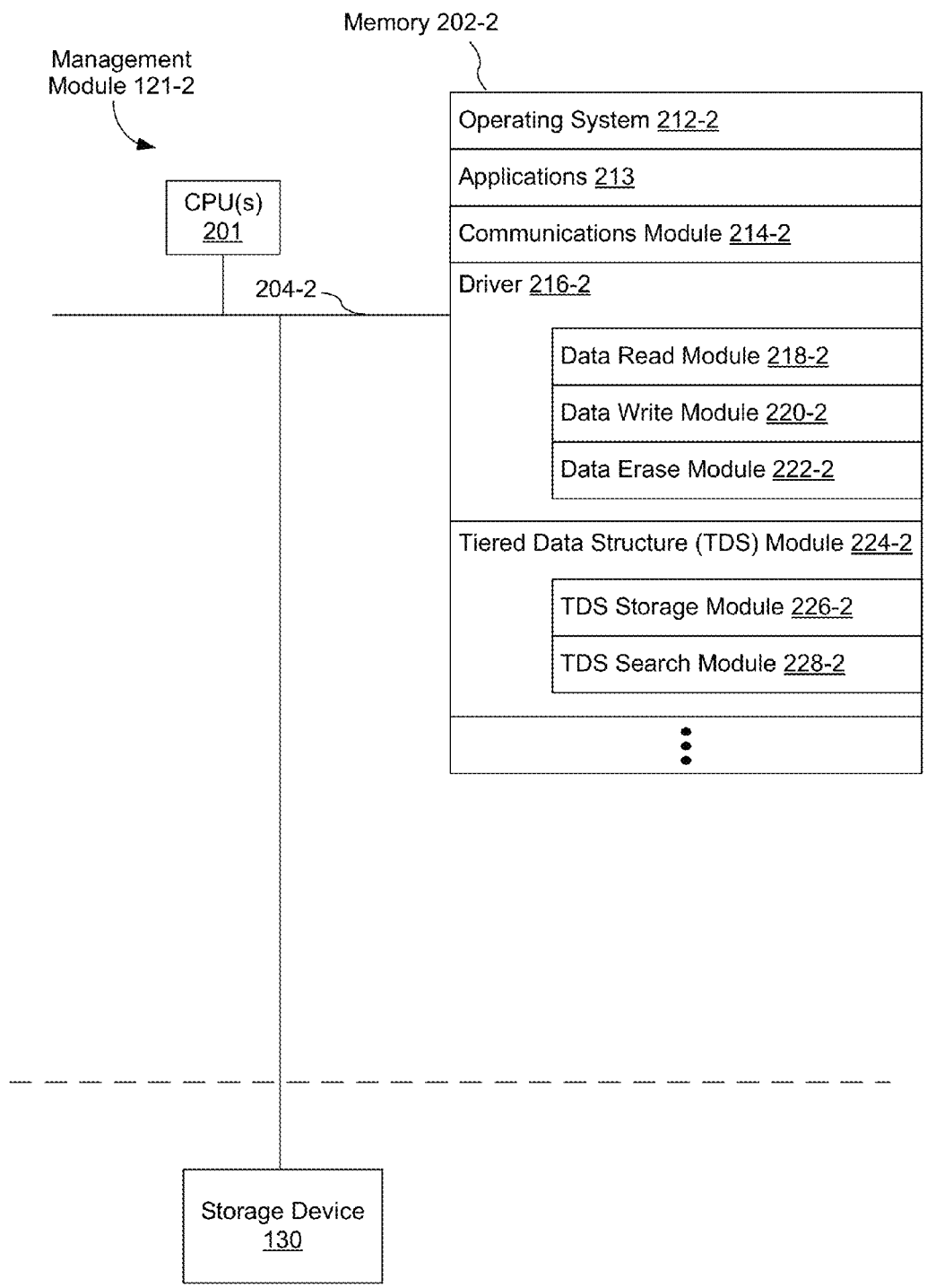
FIG. 2B is a block diagram illustrating an implementation of a management module, in accordance with some embodiments.

FIG. 2B is a block diagram illustrating a management module 121-2 (of computer system 110, FIG. 1), in accordance with some embodiments. Management module 121-2 typically includes one or more processing units 201 (sometimes called CPUs, processors, hardware processors, or microprocessors) for executing modules, programs and/or instructions stored in memory 202-2 and thereby performing processing operations, memory 202-2, and one or more communication buses 204-2 for interconnecting these components. The one or more communication buses 204-2 optionally include circuitry (sometimes called a chipset) that interconnects and controls communications between system components. Management module 121-2 is coupled to storage device 130 by the one or more communication buses 204-2. Memory 202-2 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 202-2 optionally includes one or more storage devices remotely located from the CPU(s) 201. Memory 202-2, or alternatively the non-volatile memory device(s) within memory 202-2, comprises a non-transitory computer readable storage medium. In some embodiments, memory 202-2, or the non-transitory computer readable storage medium of memory 202-2 stores the following programs, modules, and data structures, or a subset or superset thereof:

- Operating system 212-2, which includes procedures for handling various basic system services and for performing hardware dependent tasks.
- Applications 213, which include various native and/or third-party procedures for virtual machine hosting, database interface tools, data processing software, data analysis software, data management software, etc.
- Communications module 214-2, which is used for communicating with other computer systems or computer components (e.g., via host interface 129).
- Driver 216-2, which detects and processes requests received from internal requestors and/or external requestors such as additional module(s) 125, applications 213 in computer system 110, etc. (Requests are processed by, e.g., data read module 218-2, data write module 220-2, data erase module 222-2, etc.)
- Data read module 218-2, which reads data from one or more codewords, pages or blocks in a storage medium (e.g., storage medium 130).
- Data write module 220-2, which writes data to one or more codewords, pages or blocks in a storage medium (e.g., storage medium 130).
- Data erase module 222-2, which erases data from one or more blocks in a storage medium (e.g., storage medium 130).
- Tiered data structure (TDS) module 224-2, which stores and retrieves information (e.g., data objects and nodes) within one or more tiered data structures (also referred to herein as tree data structures). The one or more tiered data structures may be stored by memory 202-2, by storage medium 130, by computer system 110, etc. Tiered data structure module 224-2 includes TDS storage module 226-2 and TDS search module 228-2.
- TDS storage module 226-2, which performs memory operations (e.g., replacement, deletion, and insertion operations) by writing information, inserting a new data object, or replacing/updating the value of a data object) to leaf nodes of the one or more tiered data structures or deleting information (e.g., deleting a data object and/or replacing the value of a data object with a tombstone) from leaf nodes of the one or more tiered data structures so as to create new/modified leaf nodes and writing the new/modified leaf nodes to storage medium 130.
- TDS search module 228-2, which searches through the one or more tiered data structures for requested data (e.g., locating and retrieving a data object or node corresponding to a memory operation in a transaction requested by a requestor).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 202-2 may store a subset of the modules and data structures identified above. Furthermore, memory 202-2 may store additional modules and data structures not described above. In some embodiments, the programs, modules, and data structures stored in memory 202-2, or the non-transitory computer readable storage medium of memory 202-2, provide instructions for implementing some of the methods described below. In some embodiments, some or all of these modules may be implemented with specialized hardware circuits that subsume part or all of the module functionality.

Although FIG. 2B shows management module 121-2 in accordance with some embodiments, FIG. 2B is intended more as a functional description of the various features which may be present in management module 121-2 than as a structural schematic of the embodiments described herein. In practice, and as recognized by those of ordinary skill in the art, the programs, modules, and data structures shown separately could be combined and some programs, modules, and data structures could be separated.

Figure 3A:
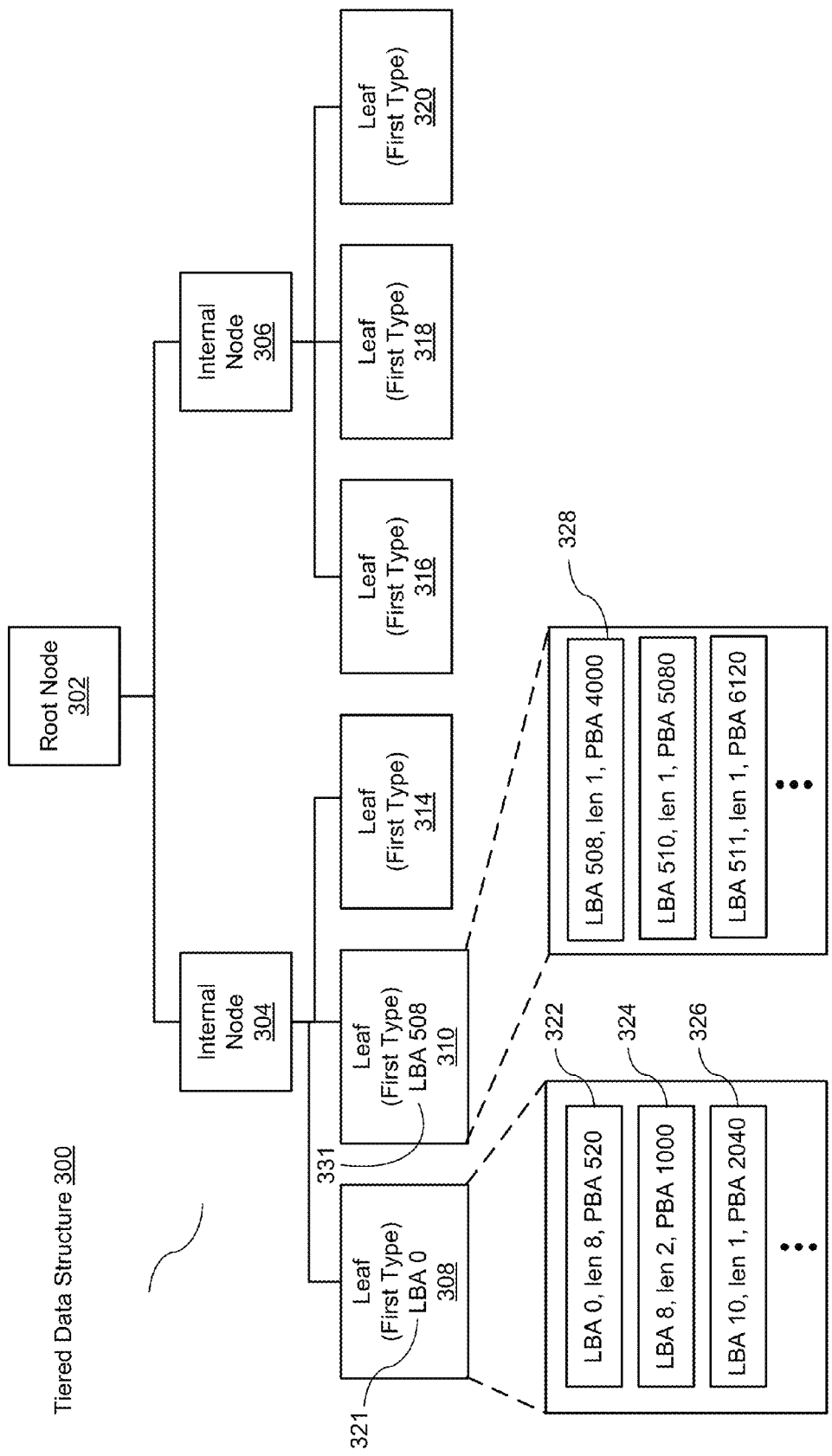
FIG. 3A illustrates an example of a tiered data structure including leaves of a first type, in accordance with some embodiments.

FIG. 3A illustrates an example of a tiered data structure 300 in accordance with some embodiments. Tiered data structure 300 includes a plurality of nodes 302-320. The plurality of nodes are organized in a tiered structure in which each respective node is connected to one or more other nodes in levels (tiers) above and/or below the respective node. A parent node for a respective node in tiered data structure 300 is a node that is a level (tier) above the respective node in tiered data structure 300. Typically, the parent node includes an entry that refers to or points to the respective node. A child node for a respective node in tiered data structure 300 is a node that is a level (tier) below the respective node in tiered data structure 300. Typically, the child node is referenced by an entry in the respective node. Two nodes are at the same level if they have a same number of nodes to traverse to reach root node 302. Root node 302 is a node that has no parent node. Internal nodes 304, 306 are nodes that have both a parent node (i.e., 302) and one or more child nodes and are thus internal to the tiered data structure. Leaf nodes 308-320 are nodes that do not have child nodes. Internal nodes 304, 306, (and, in some embodiments, root node 302) are index nodes that store information indicating a relationship with another node. For example, in some embodiments, an index node stores one or more entries that each include a memory pointer that points to a child index node or parent index node.

In some embodiments, each leaf node has a maximum size. When the leaf node exceeds the maximum size, the leaf node is split into two leaf nodes. In some embodiments, each leaf node has a minimum size. When a leaf node is below the minimum size, the leaf node is combined with one or more other leaf nodes. In some embodiments, each non-leaf node (e.g., root node or internal node) has a maximum number of child nodes. When splitting of a leaf node results in a non-leaf node having more than the maximum number of child nodes, the non-leaf node is split to accommodate the extra child nodes. In some embodiments, each non-leaf node (e.g., root node or internal node) has a minimum number of child nodes. When a combining two or more leaf nodes results in a non-leaf node having less than the minimum number of child nodes, the non-leaf node is combined with one or more other non-leaf nodes to accommodate the reduced number of child nodes. The tiered data structure may additionally conform to some or all of the rules associated with B−Trees, B+Trees, B*Trees or other tiered data structures.

In some embodiments, leaf nodes include location information such as a logical block address (LBA) of stored data. For example, leaf node 308 stores an LBA in a header field 321 (e.g., the format of leaf node 308 includes a header field 321 for storing a logical block address value). In an illustrative example, leaf node 308 stores (e.g., in a node header 321 or in a first entry 322 of node 308) an LBA of 0 and leaf node 310 stores (e.g., in a node header 331 or first entry 328 of node 310) an LBA of 508, indicating, e.g., that entries for LBAs greater than or equal to 0 and less than 508 are stored in leaf node 308.

In some embodiments, a respective leaf node of leaf nodes 308-320 (e.g., leaf node 308) includes one or more entries including location information indicating a physical location of stored data (e.g., a physical address of data stored by storage medium 130). In some embodiments, location information of an entry may be mapping information that includes an LBA for stored data and a physical address for the same data. The physical address for the data is sometimes called a physical block address (PBA). It is noted, however, that a physical block address (PBA) typically does not point to (nor correspond to) an entire block (i.e., erase block) in storage medium 130, and instead points to the location in storage medium 130 at which the data for the corresponding logical block address is stored. A logical block address typically corresponds to a unit of data (e.g., 1 KB) that is much smaller than an entire erase block of non-volatile storage, with typical logical block sizes ranging from 512 bytes to 8 KB. For ease of explanation, a logical block size of 1 KB is used in some of the examples provided below.

FIG. 3A displays a tiered data structure 300 in which leaf nodes 308-320 are all leaf nodes of a first type. Leaf nodes of a first (leaf) type are also referred to herein as "first-type leaves." In some embodiments, an entry of a leaf node of a first type includes a length of stored data. In an illustrative example, leaf node 308 includes entries 322-326. A respective entry of leaf node 308 includes an LBA, a length ("len"), and a PBA, or more generally includes a logical address, a length, and a physical address. For data stored in selectable portion 131 of storage medium 130, a PBA indicates the physical address of selectable portion 131, a length indicates the length of the data stored at (or beginning at) selectable portion 131, and an LBA indicates a logical address corresponding to data stored at selectable portion 131. For example, entry 324 of leaf 308 includes fields LBA, len, and PBA that store values of 1, 2, and 1000, respectively. In this example, entry 324 indicates data having a length of 2 logical blocks (e.g., 2 KB) stored beginning at PBA 1000 of storage medium 130. In various modules and/or devices that generate memory requests (e.g., applications 213, additional modules 125, management module 121, etc.), data stored and/or to be stored in storage medium 130 is identified using an LBA. Entries in leaves of tiered data structure 300, provide a mapping between an LBA and a PBA. For example, entry 324 provides a mapping between LBA 8 and PBA 1000. Similarly, entry 328 of leaf 310 indicates data having a length of one logical block (e.g., 1 KB) stored at PBA 4000 of storage medium 130 and entry 328 provides a mapping between LBA 508 and PBA 4000.

In some embodiments, the amount of storage space consumed by tiered data structure 224 is reduced by selectively using a second entry format that is different from the format of entries 322-326. To reduce the storage space consumed by tiered data structure 224, a respective leaf (e.g., leaf 310) having a first type of entries is converted to a leaf having a second type of entries when various conversion criteria are satisfied.

Figure 3B:
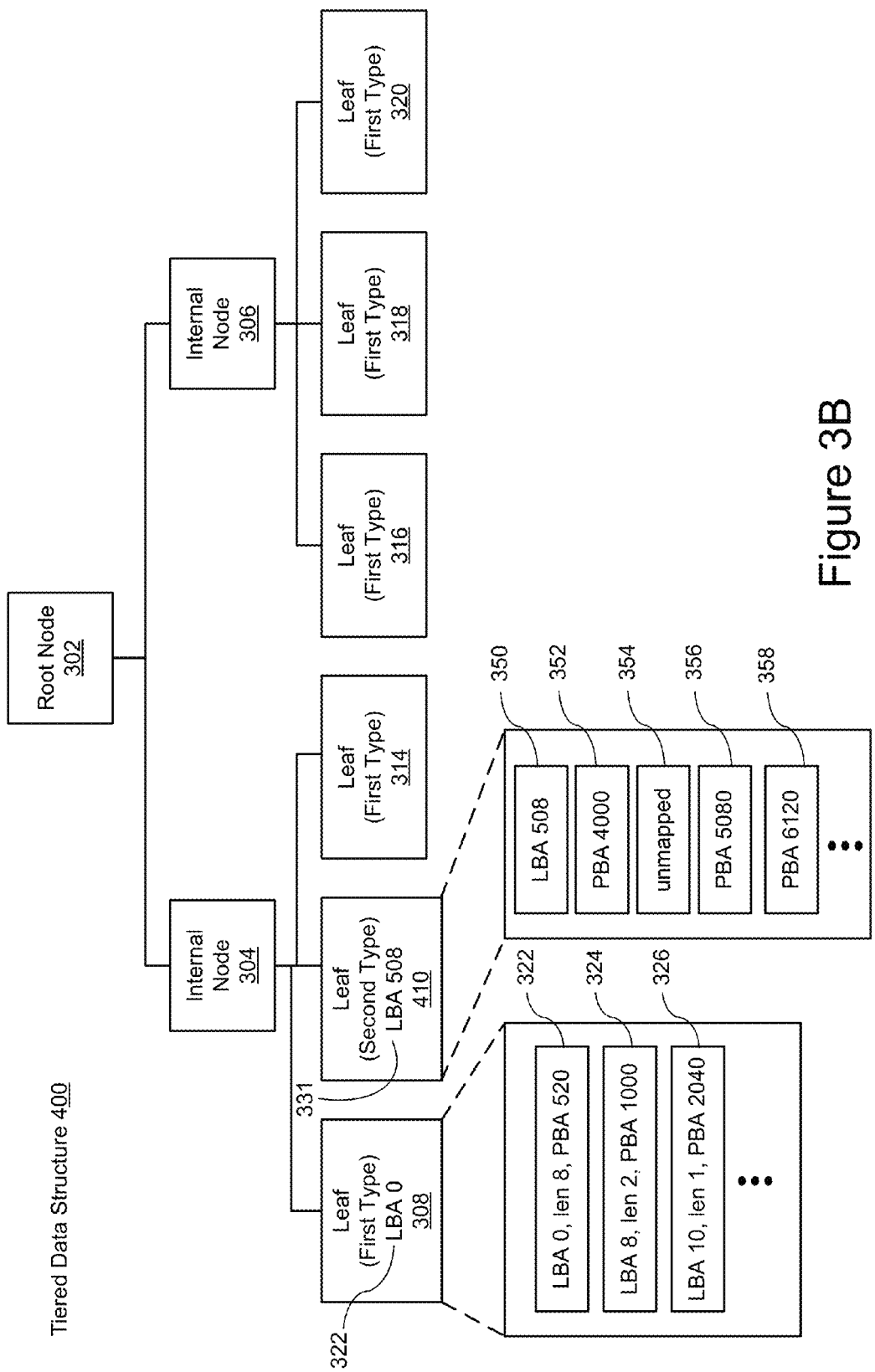
FIG. 3B illustrates an example of a tiered data structure including leaves of a first type and a leaf of a second type, in accordance with some embodiments.

FIG. 3B illustrates an example of a tiered data structure 400 in accordance with some embodiments. In FIG. 3B, the tiered data structure 300 of FIG. 3A is shown in an alternative state in which leaf 310 has been converted from a leaf of a first type to a leaf 410 of a second type. A converted leaf is also referred to herein as a "leaf of a second leaf type," and a "second-type leaf." In an illustrative example, converted leaf 410 includes entries 352-358, sometimes herein called PBA entries or mapped entries. A respective mapped entry (e.g., entry 352) of converted leaf 410 includes a PBA. For example, entries 352, 356, and 358 indicate data stored at physical block addresses PBA 4000, PBA 5080, and PBA 6120, respectively. Entry 354 is unmapped, indicating that the block is no longer in use (e.g., by computer system 110, applications 213, additional modules 125, management module 121, etc.).

An entry of a converted leaf has a fixed length and the entry typically stores no length information. For example, in FIG. 3B, each PBA value of converted leaf 410 indicates a location of data having a fixed length, for example the length of a logical block (e.g., 1 KB).

Because entries of converted leaves are fixed-length PBA entries, an LBA corresponding to a first PBA entry in a converted leaf is determinable from a single, starting point LBA stored by the converted leaf (e.g., in a node header 331 of the converted leaf, such as LBA 508 stored by converted leaf 410, or in an LBA entry 350 positioned, for example, before the LBA entries of the converted leaf). For example, an LBA of entry 356 is determined by adding an integer (e.g., 2) corresponding to the position of entry 356 in leaf node 410 to the starting point LBA 508, to produce an LBA of 510 for entry 356.

Figure 4:
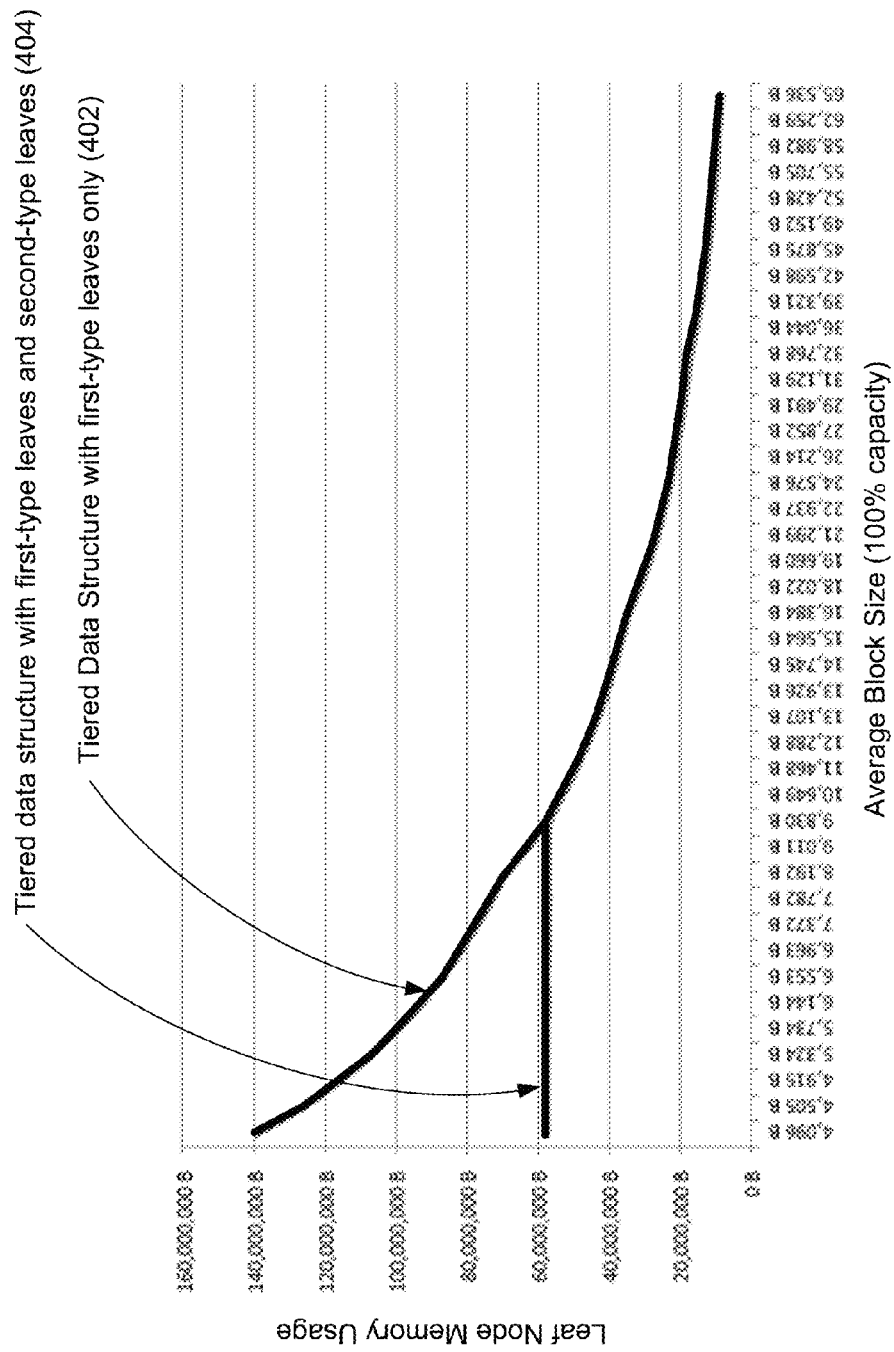
FIG. 4 illustrates calculated performance values of a tiered data structure including only leaves of a first type compared with calculated performance values of a tiered data structure including leaves of a first type and leaves of a second type.

FIG. 4 illustrates calculated performance values of a tiered data structure in which only first type leaves are used (402) in comparison with calculated performance values of a tiered data structure in which first type leaves and second type leaves are used (404). The data shown in FIG. 4 is calculated for a device with a 4 KB format (e.g., page and logical block) size. In comparison with tiered data structure 404, data usage by tiered data structure 402 grows at an increasing rate as the average block size of data written to a device drops below twice the format size (i.e., below 8 KB). FIG. 4 demonstrates the data usage savings that can be realized by using a hybrid tiered data structure, using both first type leaves and second type leaves, such as the tiered data structure shown in FIG. 3B.

Figure 5A:
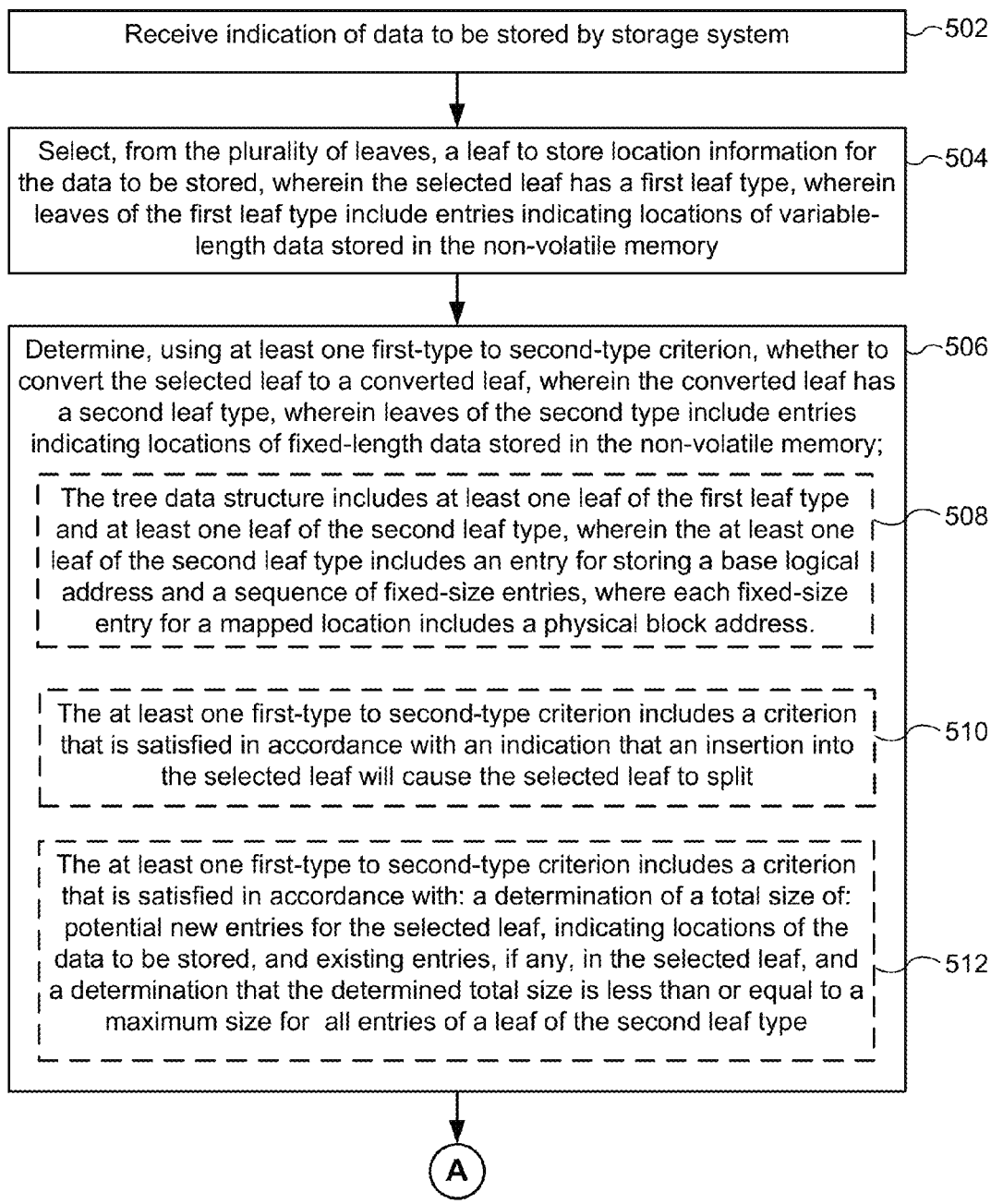
Figure 5B:
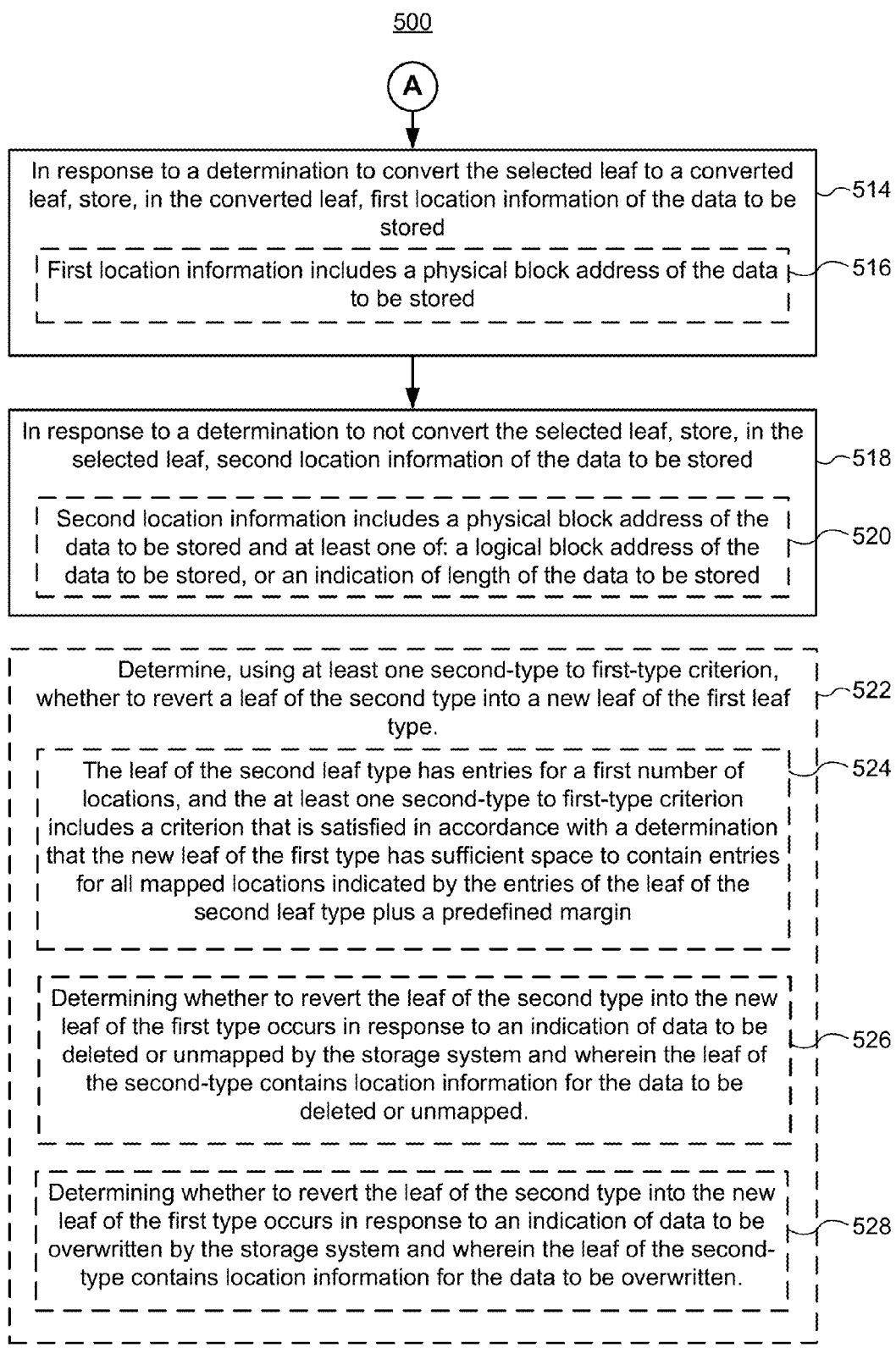

FIGS. 5A-5C illustrate a flowchart representation of a method 500 of storing metadata, in accordance with some embodiments. In some embodiments, the method 500 includes receiving (502), at a computing device (e.g., storage controller 124) of a storage system (e.g., data storage system 100) including non-volatile memory (e.g., storage medium 130) and a tiered data structure (e.g., tiered data structure module 224), an indication of data to be stored by the storage system. For example, storage controller 124 receives a write command or instruction that specifies data to be stored. The corresponding write operation, for storing the specified data, is performed by data write module 220, (e.g., in response to an instruction received from an application 213 executed by computer system 110). The write operation stores data (e.g., data received from computer system 110) to storage medium 130. In some embodiments, storage controller 124 receives information indicating logical locations (e.g., LBAs) assigned to the data to be stored in storage medium 130.

In some embodiments, method 500 includes, selecting (504), from the plurality of leaves (e.g., leaves 308, 410, and 314-320 of FIG. 4A), a leaf (e.g., leaf 308 of FIG. 3B) to store location information for the data to be stored. The selected leaf has a first leaf type. For example, leaf 308 as shown in FIG. 3B is a leaf having a first leaf type. Leaves of the first leaf type include entries indicating locations of variable-length data stored in non-volatile memory (storage medium 130). For example, as discussed with regard to FIGS. 3A and 3B, because entries of first-type leaves store variable-length data, entries 322-326 of first-type leaf 308 (FIG. 3A) and entry 328 of first-type leaf 310 (FIG. 3A) include entries with a length field ("len") for storing a value indicating a length of stored data.

In some embodiments, method 500 includes determining (506), using at least one first-type to second-type criterion, whether to convert the selected leaf (e.g., leaf 310 as shown in FIG. 3A) to a converted leaf (e.g., leaf 410 as shown in FIG. 3B). The converted leaf has the second leaf type. Leaves of the second type include entries indicating locations of fixed-length data stored in the non-volatile memory. For example, leaf 410 as shown in FIG. 3B includes entries 352, 356, and 358, each of which indicates a PBA of a fixed-length amount of data (e.g., typically a fixed amount between 512 bytes and 8 KB), stored in storage medium 130.

In some embodiments, tiered data structure 400 includes (508) at least one leaf of the first leaf type (e.g., leaf 308 as shown in FIG. 3B) and at least one leaf of the second leaf type (e.g., leaf 410 as shown in FIG. 3B). The leaf of the second leaf type stores a base logical address (e.g., LBA 508 for leaf 410) and a sequence of fixed-size entries (e.g., entries 352, 356, 358 as shown in FIG. 3B). Each fixed-size entry 352, 356, 358 for a mapped location includes a PBA field for storing a PBA value. In some circumstances or in some embodiments, the fixed-sized entries of a second leaf type indicate contiguous blocks of stored data in storage medium 130. More generally, though, the fixed-sized entries of a second leaf type correspond to contiguous blocks in a logical address space (e.g., a logical address used by computer system 110, FIG. 1), starting at either the base logical address for the leaf, or at the logical address associated with the first mapped entry in the leaf.

As discussed above with regard to 506, at least one first-type to second-type criterion is used to determine whether to convert the selected leaf to a converted leaf. In some embodiments, the at least one first-type to second-type criterion includes (510) a criterion that is satisfied in accordance with an indication that an insertion into the selected leaf (e.g., leaf 310 as shown in FIG. 3A) will cause the selected leaf to split. An indication that an insertion into the selected leaf will cause the selected leaf to split occurs, for example, when 1) the selected leaf contains a maximum number of entries specified for first-type leaves of the tiered data structure, and 2) an entry cannot be inserted into a neighbor of the selected leaf. In some embodiments, a maximum number of entries for a leaf of a first type is, e.g., 508 entries (e.g., when a tiered data structure has a 4 KB leaf node size and the format first-type leaf entries includes a 24-bit LBA, an 8-bit length, and a 32-bit PBA). In various embodiments, a maximum number of entries for a leaf of a first type is value in a range of 200 to 1000, such as 451, 406, 369, or 338. In an illustrative example in which leaf 310 as shown in FIG. 3A is a selected leaf, an insertion into leaf 310 will cause leaf 310 to split when criteria (1) and (2) discussed above are satisfied, that is, when leaf 310 is full (i.e., contains a maximum number of entries as defined for leaves of tiered data structure 400) and when leaf 310 cannot move one of its entries to a neighboring leaf (e.g., cannot move entry 328 to leaf 308 or leaf 314). In some embodiments, a leaf 310 is unable to move one of its entries to a neighboring leaf when the neighboring leaves (e.g., a neighboring leaf "to the left," if any, having lower logical addresses than the logical addresses of the mapped entries in leaf 310, and a neighboring leaf "to the right," if any, having higher logical addresses than the logical addresses of the mapped entries in leaf 310) are full.

In some embodiments, the at least one first-type to second-type criterion includes (512) a criterion that is satisfied in accordance with 1) a determination of a total size of: a) potential new entries for the selected leaf, indicating locations of the data to be stored, and b) existing entries, if any, in the selected leaf, and 2) a determination that the determined total size is less than or equal to a maximum size for all entries of a leaf of the second leaf type. For example, the criterion is satisfied when the following is true:

If entry[incoming]·LBA>=entry[first]·LBA:

entry[incoming]·LBA+entry[incoming]·len−entry[first]·LBA≤Max,

If the entry[incoming]·LBA<entry[first]·LBA:

entry[last]·LBA+entry[last]·len−entry[incoming]·LBA≤Max where Max is a maximum number of entries for a second type leaf. As shown, the mathematical representation of the criterion differs depending on whether the incoming LBA is lower or higher than the first LBA in the leaf. A maximum number of entries for a second type leaf may be a value in a range of 200 to 2000 entries, for example, 1016 entries when a 32 bit PBA value is stored in each entry, or 812 entries when a 40 bit PBA value is stored in each entry, etc.

In an illustrative example, an incoming entry for received data has LBA 1300 and length 8. A first entry 328 in leaf 310 as shown in FIG. 3A has LBA 508. The criterion as described with regard to operation 512 (FIG. 5A) is satisfied when Max=812 because (1300+8)−(508) is less than 812.

In various embodiments, a first-type leaf is converted to a second-type leaf only when both a first-type to second-type criterion as described with regard to operation 510 and a first-type to second-type criterion as described with regard to operation 512 are satisfied.

In some embodiments, in response to a determination to convert the selected leaf to a converted leaf, method 500 stores (514), in the converted leaf (e.g. leaf 410 as shown in FIG. 3B), first location information of the data to be stored.

In some embodiments, the first location information includes (516) a PBA of the data to be stored. For example, entry 358 of leaf 310 as shown in FIG. 3B includes a PBA indicating a location in memory 130 (such as a PBA for a selectable portion 131) of the data to be stored. The value 6120 stored as a PBA in entry 358 of leaf 310 is an example of first location information of data to be stored. In various embodiments, entries of a converted leaf do not include length metadata for data to be stored. Because the PBA field of entries in converted leaves has a fixed size (e.g., a tiered data structure is defined such that a 32-bit PBA field is used for entries of all converted leaves), it is not necessary to include length metadata for data to be stored in entries of converted leaves. Memory usage by the tiered data structure is reduced in some cases, such as when variable sized data writes to memory include many small sized writes, by using converted leaves with entries that store location information without storing length metadata for data to be stored.

In some embodiments, in response to a determination to not convert the selected leaf, the method 500 stores (518), in the selected leaf (e.g., leaf 310 as shown in FIG. 3A), second location information of the data to be stored.

In some embodiments, the second location information includes (520) a PBA of the data to be stored and at least one of: an LBA (i.e., key) of the data to be stored, or an indication of length of the data to be stored. In various embodiments, second location information includes an LBA, a length, and a PBA. For example, second location information stored in entry 328 of selected leaf 310 as shown in FIG. 3A includes LBA (508), length (2) and PBA (4000).

In some embodiments, method 500 includes determining (522), using at least one second-type to first-type criterion, whether to revert a leaf of the second type (e.g., leaf 410 as shown in FIG. 3B) into a new leaf of the first leaf type (e.g., leaf 310 as shown in FIG. 3A). In some embodiments, a second-type to first-type criterion is applied after processing a trigger condition as discussed below with regard to operations (526) and (528).

In some embodiments, the leaf of the second leaf type has entries for a first number of locations, and the at least one second-type to first-type criterion includes (524) a criterion that is satisfied in accordance with a determination that the new leaf of the first type has sufficient space to contain entries for all mapped locations indicated by the entries of the leaf of the second leaf type plus a predefined margin. For example, a leaf of the second type may include entries for PBAs 4000, 5080, and 6120, as indicated by entries 352, 354, and 358 (FIG. 3B), respectively. In the example shown in FIG. 3B, a second-type to first-type criterion is satisfied if a maximum number of entries for a first leaf type exceeds the number of entries required to store mapping information for PBAs 4000, 5080, and 6120 by a sufficient margin (e.g., leaving space available for one additional entry in the first-type leaf).

In some embodiments, determining whether to revert the leaf of the second type into the new leaf of the first type, as discussed with regard to operation 522, occurs (526) in response to an indication of data to be deleted or unmapped by the storage system. The leaf of the second-type (e.g., leaf 310 as shown in FIG. 3B) contains location information (e.g., a PBA as indicated in entry 352) for the data to be deleted or unmapped. For example, reverting the leaf of the second type into a new leaf of the first type is triggered by a deletion, such as a deletion performed by data erase module 222 (e.g., in response to an instruction received from an application 213 executed by computer system 110).

In some embodiments, determining whether to revert the leaf of the second type into the new leaf of the first type, as discussed with regard to (522), occurs (528) in response to an indication of data to be overwritten by the storage system. The leaf of the second-type (e.g., leaf 310 as shown in FIG. 3B) contains location information (e.g., a PBA as indicated in entry 352) for the data to be overwritten. For example, reverting the leaf of the second type into a new leaf of the first type is triggered by an overwrite, such as an overwrite performed by data write module 220 (e.g., in response to an instruction received from an application 213 executed by computer system 110).

In some embodiments, one or more of the receiving, selecting, determining, storing in the converted leaf, or storing in the selected leaf are performed (530) by a storage device 120 of storage system 100 (e.g., performed by management module 121-1). Storage device 120 stores the data to be stored, e.g., in storage medium 130.

In some embodiments, one or more of the receiving, selecting, determining, storing in the converted leaf, or storing in the selected leaf are performed (532) by one or more subsystems of the storage system 100 distinct from a storage device 120 (e.g., performed by management module 121-2 of computer system 110). Storage device 120 stores the data to be stored, e.g., in storage medium 130.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The semiconductor memory elements located within and/or over a substrate may be arranged in two or three dimensions, such as a two dimensional memory structure or a three dimensional memory structure.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array; or two or more 2D and/or 3D memory devices, packaged together to form a stacked-chip memory device.

One of skill in the art will recognize that this invention is not limited to the two dimensional and three dimensional structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first storage device could be termed a second storage device, and, similarly, a second storage device could be termed a first storage device, without changing the meaning of the description, so long as all occurrences of the "first storage device" are renamed consistently and all occurrences of the "second storage device" are renamed consistently. The first storage device and the second storage device are both storage devices, but they are not the same storage device.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of storing metadata, the method comprising:
    at a computing device of a storage system including non-volatile memory and a tiered data structure, wherein the tiered data structure includes a plurality of leaves:
    receiving an indication of data to be stored by the storage system;
    selecting, from the plurality of leaves, a leaf to store location information for the data to be stored, wherein the selected leaf has a first leaf type, wherein leaves of the first leaf type include entries indicating locations of variable-length data stored in the non-volatile memory;
    determining, using at least one first-type to second-type criterion, whether to convert the selected leaf to a converted leaf, wherein the converted leaf has a second leaf type, wherein leaves of the second type include entries indicating locations of fixed-length data stored in the non-volatile memory;
    in response to a determination to convert the selected leaf to a converted leaf, storing, in the converted leaf, first location information of the data to be stored; and
    in response to a determination to not convert the selected leaf, storing, in the selected leaf, second location information of the data to be stored.

2. The method of claim 1, wherein the first location information includes a physical address of the data to be stored, and the second location information includes the physical address of the data to be stored and at least one of:
    a logical block address of the data to be stored, or
    an indication of length of the data to be stored.

3. The method of claim 1, wherein the tiered data structure includes at least one leaf of the first leaf type and at least one leaf of the second leaf type, wherein the at least one leaf of the second leaf type stores a base logical address and a sequence of fixed-size entries, where each fixed-size entry for a mapped location includes a physical block address.

4. The method of claim 1, wherein the at least one first-type to second-type criterion includes a criterion that is satisfied in accordance with an indication that an insertion into the selected leaf will cause the selected leaf to split.

5. The method of claim 1, wherein the at least one first-type to second-type criterion includes a criterion that is satisfied in accordance with:
    a determination of a total size of:
        potential new entries for the selected leaf, indicating locations of the data to be stored, and
        existing entries, if any, in the selected leaf; and
    a determination that the determined total size is less than or equal to a maximum size for all entries of a leaf of the second leaf type.

6. The method of claim 1, further comprising:
    determining, using at least one second-type to first-type criterion, whether to revert a leaf of the second type into a new leaf of the first leaf type.

7. The method of claim 6, wherein the leaf of the second leaf type has entries for a first number of locations, and the at least one second-type to first-type criterion includes a criterion that is satisfied in accordance with a determination that the new leaf of the first type has sufficient space to contain entries for all mapped locations indicated by the entries of the leaf of the second leaf type plus a predefined margin.

8. The method of claim 6, wherein determining whether to revert the leaf of the second type into the new leaf of the first type occurs in response to an indication of data to be deleted or unmapped by the storage system and wherein the leaf of the second type contains location information for the data to be deleted or unmapped.

9. The method of claim 6, wherein the determining whether to revert the leaf of the second type into the new leaf of the first type occurs in response to an indication of data to be overwritten by the storage system and wherein the leaf of the second type contains location information for the data to be overwritten.

10. The method of claim 1, wherein one or more of the receiving, selecting, determining, storing in the converted leaf, or storing in the selected leaf are performed by a storage device of the storage system, wherein the storage device stores the data to be stored.

11. The method of claim 1, wherein one or more of the receiving, selecting, determining, storing in the converted leaf, or storing in the selected leaf are performed by one or more subsystems of the storage system distinct from a storage device, wherein the storage device stores the data to be stored.

12. A storage device, comprising:
    non-volatile memory; and a controller having one or more processors and controller memory storing one or more programs, which when executed by the one or more processors, cause the storage device to:

receive an indication of data to be stored by the storage device;

select, from the plurality of leaves, a leaf to store location information for the data to be stored, wherein the selected leaf has a first leaf type, wherein leaves of the first leaf type include entries indicating locations of variable-length data stored in the non-volatile memory;

determine, using at least one first-type to second-type criterion, whether to convert the selected leaf to a converted leaf, wherein the converted leaf has a second leaf type, wherein leaves of the second type include entries indicating locations of fixed-length data stored in the non-volatile memory;

in response to a determination to convert the selected leaf to a converted leaf, store, in the converted leaf, first location information of the data to be stored; and in response to a determination to not convert the selected leaf, store, in the selected leaf, second location information of the data to be stored.

13. The storage device of claim 12, wherein the selected leaf comprises a leaf node of a tiered data structure stored in the non-volatile memory, and the controller includes a tiered data structure module that stores and retrieves information within the tiered data structure.

14. The storage device of claim 12, wherein the first location information includes a physical address of the data to be stored, and the second location information includes the physical address of the data to be stored and at least one of:
   a logical block address of the data to be stored, or
   an indication of length of the data to be stored.

15. The storage device of claim 12, wherein the tiered data structure includes at least one leaf of the first leaf type and at least one leaf of the second leaf type, wherein the at least one leaf of the second leaf type stores a base logical address and a sequence of fixed-size entries, where each fixed-size entry for a mapped location includes a physical block address.

16. The storage device of claim 12, wherein the at least one first-type to second-type criterion includes a criterion that is satisfied in accordance with an indication that an insertion into the selected leaf will cause the selected leaf to split.

17. The storage device of claim 12, wherein the at least one first-type to second-type criterion includes a criterion that is satisfied in accordance with:
   a determination of a total size of:
   potential new entries for the selected leaf, indicating locations of the data to be stored, and
   existing entries, if any, in the selected leaf; and
   a determination that the determined total size is less than or equal to a maximum size for all entries of a leaf of the second leaf type.

18. The storage device of claim 12, wherein the one or more programs, when executed by the one or more processors, further cause the storage device to determine, using at least one second-type to first-type criterion, whether to revert a leaf of the second type into a new leaf of the first leaf type.

19. The storage device of claim 18, wherein the leaf of the second leaf type has entries for a first number of locations, and the at least one second-type to first-type criterion includes a criterion that is satisfied in accordance with a determination that the new leaf of the first type has sufficient space to contain entries for all mapped locations indicated by the entries of the leaf of the second leaf type plus a predefined margin.

20. A non-transitory computer readable storage medium, storing one or more programs configured for execution by one or more processors of the controller of a storage device, the storage device including non-volatile memory, the one or more programs including instructions that when executed by the one or more processors, cause the storage device to:

receive an indication of data to be stored by the storage device;

select, from the plurality of leaves, a leaf to store location information for the data to be stored, wherein the selected leaf has a first leaf type, wherein leaves of the first leaf type include entries indicating locations of variable-length data stored in the non-volatile memory;

determine, using at least one first-type to second-type criterion, whether to convert the selected leaf to a converted leaf, wherein the converted leaf has a second leaf type, wherein leaves of the second type include entries indicating locations of fixed-length data stored in the non-volatile memory;

in response to a determination to convert the selected leaf to a converted leaf, store, in the converted leaf, first location information of the data to be stored; and in response to a determination to not convert the selected leaf, store, in the selected leaf, second location information of the data to be stored.

21. The non-transitory computer readable storage medium of claim 20, wherein the selected leaf comprises a leaf node of a tiered data structure stored in the non-volatile memory, and the controller includes a tiered data structure module that stores and retrieves information within the tiered data structure.

* * * * *